(12) United States Patent
Kim et al.

(10) Patent No.: US 11,513,626 B2
(45) Date of Patent: Nov. 29, 2022

(54) DISPLAY DEVICE INCLUDING TOUCH SENSOR AND MANUFACTURING METHOD FOR THE SAME

(71) Applicant: LG DISPLAY CO., LTD., Seoul (KR)

(72) Inventors: Duha Kim, Paju-si (KR); Jinho Cho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/550,252

(22) Filed: Dec. 14, 2021

(65) Prior Publication Data

US 2022/0206616 A1 Jun. 30, 2022

(30) Foreign Application Priority Data

Dec. 30, 2020 (KR) .................. 10-2020-018 8110

(51) Int. Cl.
*G06F 3/041* (2006.01)
*G09G 3/36* (2006.01)

(52) U.S. Cl.
CPC ........ *G06F 3/0412* (2013.01); *G06F 3/04164* (2019.05); *G06F 3/04184* (2019.05); *G06F 2203/04103* (2013.01); *G09G 3/3648* (2013.01); *G09G 2300/0426* (2013.01); *G09G 2310/08* (2013.01); *G09G 2354/00* (2013.01)

(58) Field of Classification Search
CPC .............. G06F 3/0412; G06F 3/04184; G06F 3/04164; G06F 2203/04103; G09G 3/3648; G09G 2300/0426; G09G 2310/08; G09G 2354/00
See application file for complete search history.

(56) References Cited

U.S. PATENT DOCUMENTS

| 2016/0202789 A1* | 7/2016 | Kim ...................... G06F 3/0446 345/174 |
| 2016/0202812 A1* | 7/2016 | Pyoun ................... G06F 3/0443 345/173 |

\* cited by examiner

*Primary Examiner* — Peter D McLoone
(74) *Attorney, Agent, or Firm* — Polsinelli PC

(57) ABSTRACT

Embodiments of the present disclosure may provide a display device including a touch sensor and a manufacturing method thereof including a first touch signal line and a second touch signal line disposed on a first insulating layer, a second insulating layer disposed on the first touch signal line and the second touch signal line, a first via connected to the first touch signal line and a second via connected to the second touch signal line through a first contact hole and a second contact hole respectively included in the second insulating layer, and a common electrode disposed on the second insulating layer, wherein the first via is connected to the common electrode and the second via is not connected to the common electrode.

19 Claims, 15 Drawing Sheets

DISPLAY DEVICE INCLUDING TOUCH SENSOR AND MANUFACTURING METHOD FOR THE SAME

CROSS REFERENCE TO RELATED APPLICATION

This application claims priority from Korean Patent Application No. 10-2020-0188110, filed on Dec. 30, 2020, which is hereby incorporated by reference for all purposes as if fully set forth herein.

BACKGROUND

Technical Field

The present disclosure relates to a display device including a touch sensor and manufacturing method thereof.

Description of the Related Art

As the information society develops, the demand for display devices for displaying images is increasing in various forms. Various types of display devices such as a liquid crystal display device (LCD), and an electroluminescence display device (ELD) have been used for this purpose.

The electroluminescence display device (ELD) may include a quantum-dot (QD) light emitting display device including a quantum dot, an inorganic light emitting display device, and an organic light emitting display device.

In addition, the display device may include a touch sensor in order to allow the user to intuitively use.

In a display device including a touch sensor, the touch sensor includes a plurality of touch electrodes. Since the touch sensor is located on the display panel, it has been proposed a touch electrode having a metal mesh structure including a plurality of touch electrode lines. In the touch electrode lines having a metal mesh structure, a pattern defect such as a short may occur, and a defect is checked through a pattern inspection and repair process, and the touch electrode can be repaired.

However, since the touch electrodes having a metal mesh structure are formed of the same material and have a complex structure, there may be a problem that it may take a lot of time to check a defective location in the pattern inspection and repair process, thereby reducing the productivity of the display device.

SUMMARY

Embodiments of the present disclosure may provide a display device including touch sensor capable of sensing a touch and method for manufacturing the same.

Embodiments of the present disclosure may provide a display device including touch sensor capable of increasing productivity and manufacturing method thereof.

In an aspect, embodiments of the present disclosure may provide a display device including a display panel including a plurality of pixels, and a touch sensor having a first touch electrode, a second touch electrode, and a first touch signal line and a second touch signal line disposed to overlap with the first touch electrode and the second touch electrode respectively, wherein the first touch electrode includes a first lower electrode line including a first connector, a second lower electrode line including a second connector and a third connector, and a first upper electrode pattern disposed above the first lower electrode line and the second lower electrode line and connected to the first lower electrode line and the second lower electrode line through the first connector to the third connector, wherein the second touch electrode includes a third lower electrode line including a fourth connector, a fourth lower electrode line including a fifth connector and a sixth connector, and a second upper electrode pattern disposed above the third lower electrode line and the fourth lower electrode line and connected to the third lower electrode line and the fourth lower electrode line through the fourth connector to the sixth connector, wherein the first touch signal line is disposed to overlap the first lower electrode line to the fourth lower electrode line, and includes a seventh connector and eighth connector overlapping the first lower electrode line and the third lower electrode line, respectively, wherein the second touch signal line is disposed to overlap the first lower electrode line to the fourth lower electrode line, and includes a ninth connector and tenth connector overlapping the second lower electrode line and the fourth lower electrode line, respectively, and wherein the first upper electrode pattern is connected to the first touch signal line among the first touch signal line and the second touch signal line, and the second upper electrode pattern is connected to the second touch signal line among the first touch signal line and the second touch signal line.

In another aspect, embodiments of the present disclosure may provide a display device including a first touch signal line and a second touch signal line disposed on the first insulating layer, a second insulating layer disposed on the first touch signal line and the second touch signal line, a first via connected to the first touch signal line and a second via connected to the second touch signal line through a first contact hole and a second contact hole respectively included in the second insulating layer, and a common electrode disposed on the second insulating layer, wherein the first via is connected to the common electrode and the second via is not connected to the common electrode.

In another aspect, embodiments of the present disclosure may provide a manufacturing method of a display device including disposing a gate insulating layer on a lower substrate, and disposing a first lower electrode line including a first connector, a second lower electrode line including a second connector and a third connector, a third lower electrode line including a fourth connector, and a fourth lower electrode line including a fifth connector and a sixth connector; disposing a first insulating layer above the first lower electrode line to the fourth lower electrode line, and disposing a first touch signal line including a seventh connector and an eighth connector and a second touch signal line including a ninth connector and a tenth connector on the first insulating layer; disposing a second insulating layer on the second touch signal line, and forming a plurality of contact holes in the second insulating layer each disposed at positions overlapping with the first to tenth connectors; and disposing, on the second insulating layer, a first upper electrode pattern connected to the first to third connectors and the seventh connector, and a second upper electrode pattern connected to the fourth to sixth connector and the tenth connector.

According to embodiments of the present disclosure, it is possible to provide a display device including touch sensor and a manufacturing method thereof capable of detecting the touch so as to be manipulated by an user's touch.

According to embodiments of the present disclosure, it is possible to provide a display device including touch sensor and a manufacturing method thereof capable of improving productivity by facilitating inspection in the manufacturing process.

DETAILED DESCRIPTION

Figure 1:
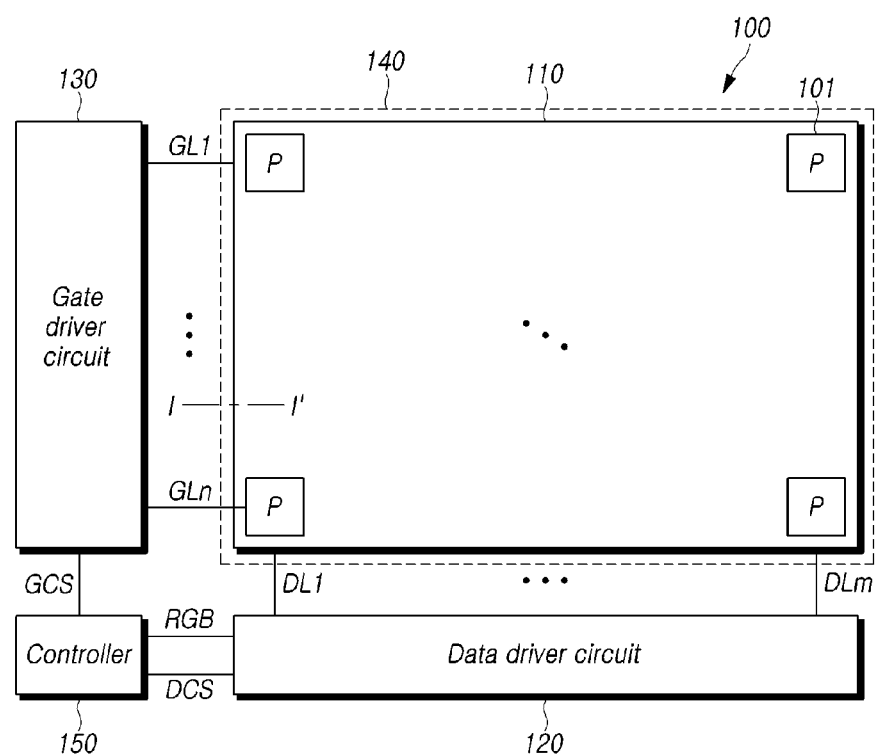
FIG. 1 is a structural diagram illustrating a display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", and "constituting" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a structural diagram illustrating a display device according to embodiments of the present disclosure.

Referring to FIG. 1, a display device 100 may include a display panel 110, a data driver circuit 120, a gate driver circuit 130, a touch sensor 140, and a controller 150.

The display panel 110 may include a plurality of pixels P 101 arranged in a matrix form. Each of the plurality of pixels 101 may emit red, green, and blue light. However, the color of light emitted from each pixel 101 is not limited thereto. In addition, the display panel 110 may have a rectangular shape.

A plurality of gate lines GL1 to GLn and a plurality of data lines DL1 to DLm are disposed in the display panel 110, and a plurality of pixels 101 may be connected to the plurality of gate lines GL1 to GLn and the plurality of data lines DL1 to DLm. Each pixel 101 may receive a data signal transmitted through the data lines DL1 to DLm in response to a gate signal transmitted through the gate lines GL1 to GLn. However, lines disposed on the display panel 110 are not limited thereto.

The data driver circuit 120 is connected to a plurality of data lines DL1 to DLm, and may transmit a data signal to the pixel 101 through the data lines DL1 to DLm. Here, although one data driver circuit 120 is shown, it is not limited thereto. In addition, the data driver circuit 120 may be an integrated circuit.

The gate driver circuit 130 may be connected to the gate lines GL1 to GLn and may supply a gate signal to the plurality of pixels 101 through the gate lines GL1 to GLn. Here, the gate driver circuit 130 is shown to be disposed on one side of the display panel 110, but is not limited thereto, and may be disposed on both sides of the display panel 110.

In addition, one gate driver circuit may be connected to an odd-numbered gate line and another gate driver circuit may be connected to an even-numbered gate line. Further, the display device 100 does not include a separate gate driver circuit, and a gate signal generation circuit for generating a gate signal may be disposed on the display panel 110.

The touch sensor 140 may be disposed to be overlapped with the display panel 110 and may sense that a user touches the display panel 110. The touch sensor 140 may include a plurality of touch electrodes and a touch lines for transmitting a touch signal to each of the touch electrodes.

The controller 150 may control the data driver circuit 120 and the gate driver circuit 130. The controller 150 may supply the image signal RGB and the data control signal DCS to the data driver circuit 120 and may supply the gate control signal GCS to the gate driver circuit 130.

In addition, the controller 150 may control the touch sensor 140. The controller 150 may supply a touch signal to the touch sensor 140 and receive a touch signal corresponding to a user's touch from the touch sensor 140 to calculate a touch position. The touch signal may include a touch driving signal for driving a plurality of touch electrodes and a touch sensing signal for detecting a touch in response to the touch driving signal. Here, the controller 150 is shown to be one component, but is not limited thereto, and the controller 150 may include the timing controller for controlling the data driver circuit 120 and the gate driver circuit 130, and a touch controller for controlling the touch sensor 140.

Figure 2:
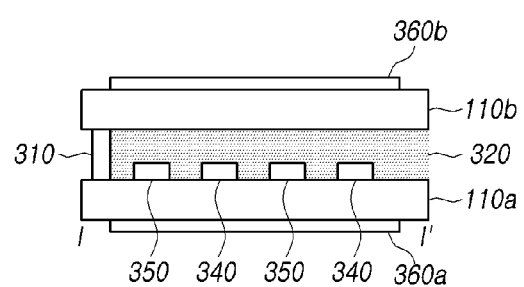
FIG. 2 is a cross-sectional view of the display device illustrated in FIG. 1 along line I-I'.

FIG. 2 is a cross-sectional view of the display device illustrated in FIG. 1 along line I-I'.

Referring to FIG. 2, the display device 100 may include a lower substrate 110*a* and an upper substrate 110*b*.

In the lower substrate 110*a*, a plurality of gate lines GL1 to GLn and a plurality of data lines DL1 to DLm shown in FIG. 1 may be disposed, and a plurality of pixels 101 connected to the gate lines GL1 to GLn and the data lines DL1 to DLm may be disposed.

A column spacer 310 may be disposed between the lower substrate 110*a* and the upper substrate 110*b*, and a gap between the lower substrate 110*a* and the upper substrate 110*b* may be maintained by the column spacer 310.

A liquid crystal 320 may be disposed between the lower substrate 110*a* and the upper substrate 110*b*. When an electric field is applied to the liquid crystal 320, the molecular arrangement of the liquid crystal 320 may be determined. In addition, the polarization direction of light passing through the liquid crystal 320 may be determined according to the molecular arrangement of the liquid crystal 320. A pixel electrode 340 and a common electrode 350 may be disposed on the lower substrate 110*a*. An electric field may be applied to the liquid crystal 320 in response to a voltage applied to the pixel electrode 340 and the common electrode 350.

The display device 100 may operate by dividing the driving time into a display period for displaying an image and a touch sensing period for detecting a touch. In addition, the common electrode may operate by dividing the driving time into a display period and a touch sensing period, in details, a common voltage Vcom, which is a predetermined DC voltage, may be supplied to the common electrode during the display period, and a touch driving signal or a load free driving signal may be supplied to the common electrode during the touch sensing period.

In addition, a first polarization plate 360*a* may be disposed on the lower surface of the lower substrate 110*a*, and a second polarization plate 360*b* may be disposed on the upper surface of the upper substrate 110*b*. The first polarization plate 360*a* and the second polarization plate 360*b* may block or transmit light traveling from the lower substrate 110*a* toward the upper substrate 110*b* in response to the molecular arrangement of the liquid crystal 320.

Figure 3:
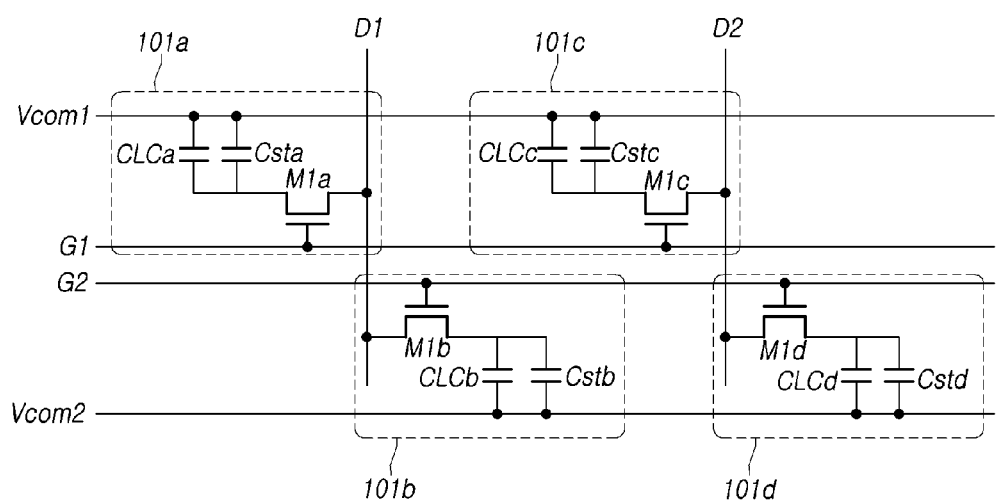
FIG. 3 is a circuit diagram illustrating an embodiment of a display device according to embodiments of the present disclosure.

FIG. 3 is a circuit diagram illustrating an embodiment of a display device according to embodiments of the present disclosure.

Referring to FIG. 3, a plurality of pixels may be arranged in a plurality of rows and columns on the display panel 110. For convenience of explanation, it is illustrated four pixels among the plurality of pixels disposed on the display panel 110.

A first pixel 101*a* may be disposed in an area where the first row and the first column intersect among the plurality of pixel rows and columns, a second pixel 101*b* may be disposed in the second row and the second column, a third pixel 101*c* may be disposed in the first row and the second column, and a fourth pixel 101*d* may be disposed in the second row and the third column. The first pixel 101*a* may include a driving transistor M1*a* connected to the gate line G1 to receive a data signal from the data line D1 in response to the gate signal, a storage capacitor Csta for storing data signals, and a liquid crystal capacitor CLCa connected in parallel with the storage capacitor Csta. The second to fourth pixels 101*b* to 101*d* may also have the same structure as the first pixel 101*a*, and have a driving transistor M1*b*, M1*c* and M1*d*, a storage capacitor Cstb, Cstc and Cstd, and a liquid crystal capacitor CLCb, CLCc and CLCd respectively.

The first and second pixels 101*a* and 101*b* may receive data signals from the first data line D1, and the third and fourth pixels 101*c* and 101*d* may receive the data signal through the second data line D2.

In addition, the first pixel 101*a* and the third pixel 101*c* may receive a gate signal from the first gate line G1, and the second pixel 101*b* and the fourth pixel 101*d* may receive a gate signal from the second gate line G2. In addition, the first gate line G1 and the second gate line G2 may be disposed adjacent to each other, and may be disposed in a space between the first and third pixels 101*a* and 101*c*, and between the second and fourth pixels 101*b* and 101*d*, respectively.

The first to fourth pixels 101*a* to 101*d* may be disposed between a first common voltage line Vcom1 and a second common voltage line Vcom2. The first common voltage line Vcom1 may supply a common voltage to the first pixel 101*a* and the third pixel 101*c*, and the second common voltage line Vcom2 may supply the common voltage to the second pixel 101*b* and the fourth pixel 101*d*.

As shown, if two columns of pixel columns are arranged to be connected to one data line D1 or another data line D2, respectively, the number of pixel columns disposed on the display panel 110 can be reduced by half.

Accordingly, in the display panel 110 in which a plurality of pixels are arranged in the form of m*n, the number of data lines may be reduced to m/2. When the number of data lines decreases, the number of lines disposed on the display panel 110 also decreases, and thus the aperture ratio of the display panel 110 may be improved. In addition, the size of the data driver circuit 120 outputting the data signal can be reduced.

Figure 4:
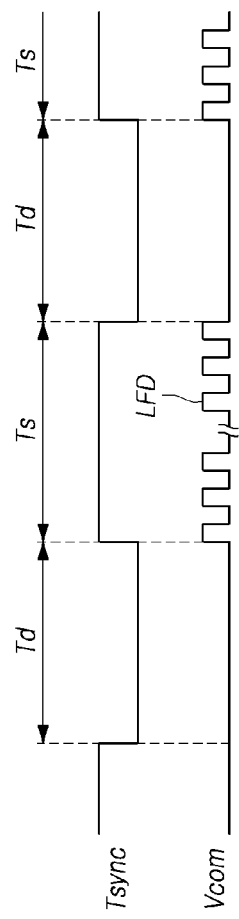
FIG. 4 is a timing diagram illustrating driving of a display device according to embodiments of the present disclosure.

FIG. 4 is a timing diagram illustrating driving of a display device according to embodiments of the present disclosure.

Referring to FIG. 4, a display device 100 may operate by dividing the driving time into a display period Td and a touch sensing period Ts. In the display period Td, the touch display device 100 may supply a data signal to each pixel 101 to emit light. The display device 100 may operate by dividing the driving time into the display period Td and the touch sensing period Ts in response to the touch synchronization signal Tsync.

The display device 100 may operate as the display period Td when the touch synchronization signal Tsync is in a low state, and may operate as the touch sensing period Ts when the touch synchronization signal Tsync is in a high state.

In the display device 100, the common electrode may receive a load free driving signal during the touch sensing period Ts. In the display device 100, a touch driving signal may be supplied to a specific touch signal line among a plurality of touch signal lines, and a load free driving signal LFD synchronized with the touch driving signal may be transmitted to the other touch signal lines.

In addition, the touch driving signal applied to the touch electrode in order to sense a touch may have the same phase and amplitude as the load free driving signal, and thus may be signals that are not distinguished from each other.

The difference in the signal between a specific touch signal line receiving the touch driving signal by the load free driving signal and the other touch signal line that does not receive a touch driving signal may be minimized to prevent the generation of parasitic capacitance between the touch signal lines.

If the parasitic capacitance is not generated between the touch signal lines, the power consumption of the display device 100 may be reduced. In addition, since noise may be reduced in the touch signal line of the display device 100, a touch may be more accurately detected by the touch sensing signal.

Here, although the lengths of the display period Td and the touch sensing period Ts are shown to be the same, it is not limited thereto. Also, the touch sensing period Ts may be included in a blank period. The blank period may be included in any one of a vertical blank period and a horizontal blank period. However, it is not limited thereto.

Figure 5:
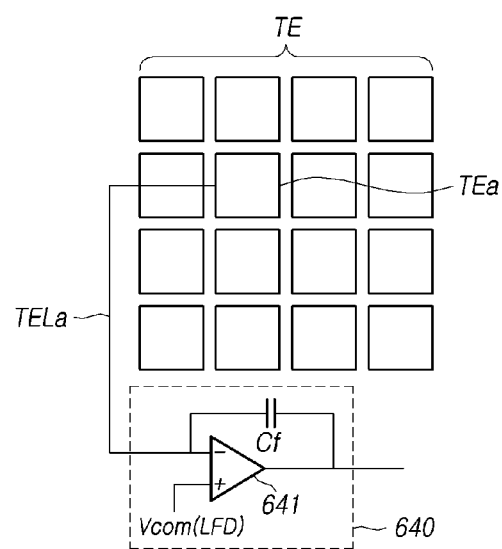
FIG. 5 is a conceptual diagram illustrating a touch sensor employed in a display device according to embodiments of the present disclosure.

FIG. 5 is a conceptual diagram illustrating a touch sensor employed in a display device according to embodiments of the present disclosure.

Referring to FIG. 5, the touch sensor 140 may include a plurality of touch electrodes TE, and each touch electrode TE may be connected to a touch circuit 640 through a touch signal line. Here, it is illustrated that only one touch signal line TELa is connected to only one touch electrode TEa, but this is only for illustration purposes. The touch electrode TEa connected to the touch signal line TELa may refers to a touch electrode to which a touch driving signal is applied.

The touch circuit 640 may be connected to the touch electrode TEa through the touch signal line TELa. The touch circuit 640 may be included in the controller 150 illustrated in FIG. 1, and may include a feedback capacitor Cf. An amplifier 641 may receive a common voltage Vcom or a load free driving signal LFD through positive input terminals (+). Here, since the load free driving signal LFD is a signal having the same frequency and phase as the touch driving signal, it may be understood that the amplifier 641 receiving the load-free driving signal LFD may be also supplied with the touch driving signal.

The common voltage Vcom may be transmitted in the display period Td illustrated in FIG. 4 and the load free driving signal LFD may be transmitted in the touch sensing period Ts illustrated in FIG. 4. The negative input terminal (−) of the amplifier 641 may be connected to the touch signal line TELa and may receive a current flowing through the touch signal line TELa.

The load free driving signal LFD may be transmitted through positive input terminals (+) of the amplifier 641. In addition, the load free driving signal LFD transmitted through the positive input terminal (+) of the amplifier 641 may be transmitted to the touch electrode TEa through the negative input terminal (−). The amplifier 641 may compare the load free driving signal LFD transmitted through the positive input terminal (+) with the signal transmitted through the negative input terminal (−), and may sense a touch by storing the comparison result as a predetermined voltage in the feedback capacitor Cf.

FIGS. 6A to 6E are conceptual diagrams illustrating a manufacturing method of a touch sensor according to embodiments of the present disclosure.

Referring to FIGS. 6A to 6E, a touch sensor 140 may include a first touch electrode TE1, a second touch electrode TE2, and a first touch signal line 611 and a second touch signal line 612 disposed to overlap with the first touch electrode TE1 and the second touch electrode TE2, respectively. The first touch electrode TE1 may be connected to the first touch signal line 611 and the second touch electrode TE2 may be connected to the second touch signal line 612.

Figure 6A:
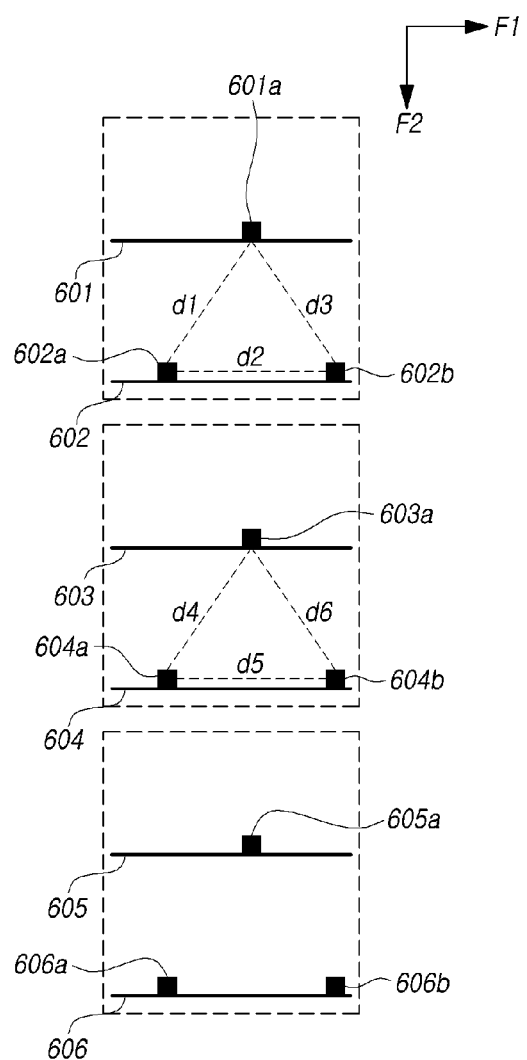
FIGS. 6A to 6E are conceptual diagrams illustrating a manufacturing method of a touch sensor according to embodiments of the present disclosure.

First, as shown in FIG. 6A, there may be arranged a first lower electrode line 601 including a first connector 601a, and a second lower electrode line 602 including a second connector 602a and a third connector 602b. In addition, there may be disposed a third lower electrode line 603 including the fourth connector 603a, and a fourth lower electrode line 604 including the fifth connector 604a and the sixth connector 604b.

The first to fourth lower electrode lines 601 to 604 may extend in a first direction F1. The first to fourth lower electrode lines 601 to 604 may be disposed on a gate insulating layer (not shown) on the lower substrate 110a.

The distance d1 between the first connector 601a and the second connector 602a, the distance d2 between the second connector 602a and the third connector 602b, and The distance d3 between the third connector 602b and the first connector 601a may be the same as the distance d4 between the fourth connector 603a and the fifth connector 604a and the distance d5 between the fifth connector 604a and the sixth connector 604b and the distance d6 between the sixth connector 604b and the fourth connector 603a, respectively. As a result, the pattern in which the first to third connectors 601a, 602a, and 602b are disposed may be the same as the pattern in which the fourth to sixth connectors 603a, 604a, and 604b are disposed If the pattern of the first lower electrode line 601 and the second lower electrode line 602 in which the first to third connectors 601a, 602a, and 602b are disposed is not same as the pattern of the third lower electrode line 603 and the fourth lower electrode line 604 in which the fourth to sixth connectors 603a, 604a, and 604b are disposed, it may be difficult to perform pattern inspection on the first to fourth lower electrode lines 601 to 604. However, in the display device according to embodiments of the present disclosure, since the pattern of the first lower electrode line 601 and the second lower electrode line 602 in which the first to third connectors 601a, 602a, and 602b are disposed is same as the pattern of the third lower electrode line 603 and the fourth lower electrode line 604 in which the fourth to sixth connectors 603a, 604a, and 604b are disposed, the pattern inspection of the first to fourth lower electrode lines 601 to 604 may be performed after the first to fourth lower electrode lines 601 to 604 are disposed.

Figure 6B:
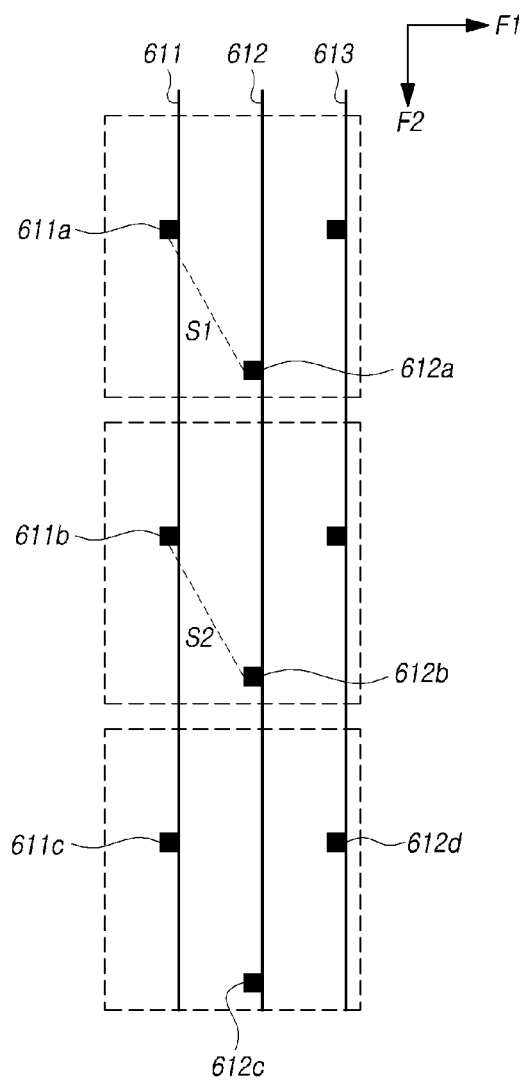

In addition, as shown in FIG. 6B, there may be disposed a first touch signal line 611 including a seventh connector 611a and an eighth connector 611b, and a second touch signal line 612 including a ninth connector 612a and a tenth connector 612b. The first touch signal line 611 and the second touch signal line 612 may extend in the second direction F2.

The first touch signal line 611 and the second touch signal line 612 may be disposed on the first lower electrode line to the fourth lower electrode line 601~604, and a first insulating layer (not shown) may be disposed between the first lower electrode line to fourth lower electrode lines 601~604 and the first touch signal line 611 and the second touch signal line 612.

The distance S1 between the seventh connector 611a and the ninth connector 612a may be the same as the distance S2 between the eighth connector 611b and the tenth connector 612b. Since the distance S1 between the seventh connector 611a and the ninth connector 612a becomes the same as the distance S2 between the eighth connector 611b and the tenth connector 612b, a pattern in which the seventh connector 611a and the ninth connector 612a are disposed may be the same as a pattern in which the eighth connector 611b and the tenth connector 612b are disposed.

If the pattern in which the seventh connector 611a and the ninth connector 612a are disposed is not same as the pattern in which the eighth connector 611b and the tenth connector 612b are disposed, it may be difficult to perform pattern inspection on the seventh to tenth connectors 611a, 611b, 612a, and 612b. However, in the display device according to embodiments of the present disclosure, since the pattern in which the seventh connector 611a and the ninth connector 612a are disposed is same as the pattern in which the eighth connector 611b and the tenth connector 612b are disposed, after the first touch signal line 611 and the second touch signal line 612 are disposed, the pattern inspection of the seventh to tenth connectors 611a, 611b, 612a, and 612b may be performed.

Figure 6C:
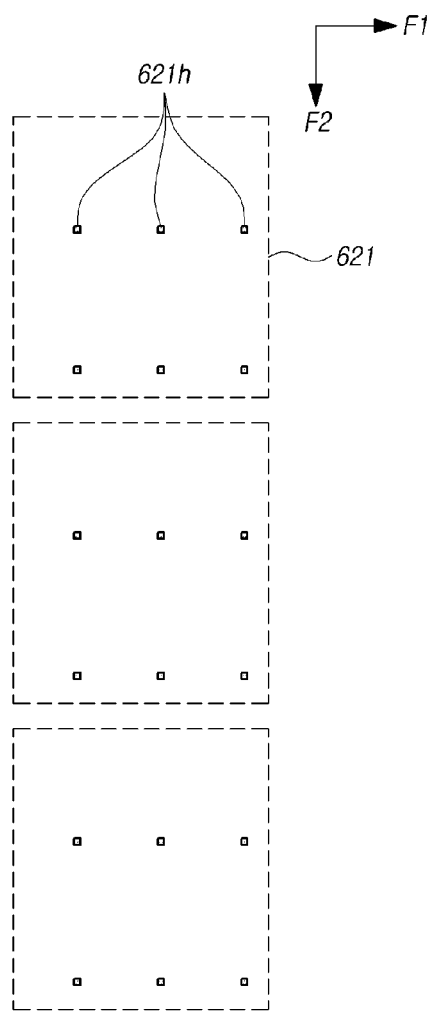

In addition, a second insulating layer 621 may be disposed as shown in FIG. 6C. The second insulating layer 621 may be disposed on the first touch signal line 611 and the second touch signal line 613. In addition, a plurality of contact holes 621h may be formed in the second insulating layer 621. Since the contact holes 621h are regularly spaced on the second insulating layer 621, the plurality of contact holes 621h have a predetermined pattern. Accordingly, patterns of the plurality of contact holes 621h formed after disposing the second insulating layer 621 are uniform, so that the pattern inspection of the second insulating layer 621 may be performed.

Figure 6D:
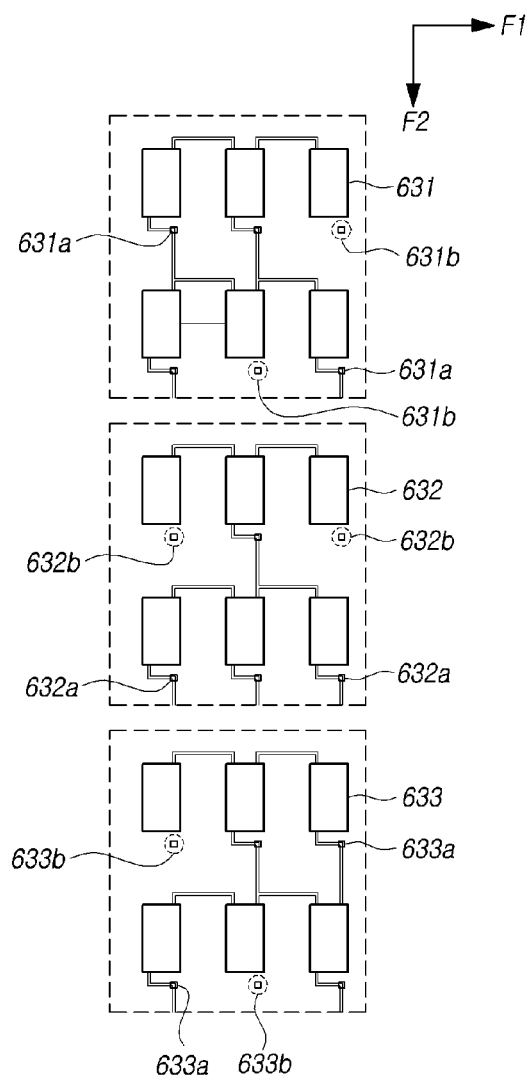

In addition, as shown in FIG. 6D, an upper electrode pattern may be disposed. The upper electrode pattern may be disposed on the second insulating layer 621. The upper electrode pattern disposed at the position corresponding to the first touch electrode TE1 may be referred to as a first upper electrode pattern 631, 631a, 631b, and the upper electrode pattern disposed at the position corresponding to the second touch electrode TE2 may be referred to as a second upper electrode patterns 632, 632a, 632b.

The first upper electrode patterns 631, 631a, 631b may include a first detection pattern 631, and a first connection pattern 631a and a first island pattern 631b corresponding to the first detection pattern 631. The first connection pattern 631a is a pattern connected to the first detection pattern 631, and the first island pattern 631b is a pattern not connected to the first detection pattern 631.

The first connection pattern 631a may be connected to the first connector 601a of the first lower electrode line 601, or the second connector 602a and the third connector 602b of the second lower electrode line 602 through the contact hole 621h. In addition, the first connection pattern 631a may be connected to the seventh connector 611a of the first touch signal line 611 through the contact hole 621h. In addition, the first island pattern 631b may be connected to the ninth connector 612a of the second touch signal line 612 through the contact hole 621h. Accordingly, the touch driving signal transmitted through the first touch signal line 611 may be transmitted to the first detection pattern 631 through the seventh connector 611a. However, since the first island pattern 631b is not connected to the first detection pattern 631, the touch driving signal transmitted through the second touch signal line 612 is not transmitted to the first detection pattern 631.

The second upper electrode patterns 632, 632a, 632b may include a second detection pattern 632, and a second connection pattern 632a and a second island pattern 632b corresponding to the second detection pattern 632. The second connection pattern 632a is a pattern connected to the second detection pattern 632, and the second island pattern 632b is a pattern not connected to the second detection pattern 632.

The second connection pattern 632a may be connected to the fourth connector 603a of the third lower electrode line 603 or the fifth connector 604a of the fourth lower electrode line 604, or the fifth connector 604a and the sixth connector 604b of the fourth lower electrode line 604 through the contact hole 621h. The second connection pattern 632a may be connected to the tenth connector 612b of the second touch signal line 612 through a contact hole 621h. In addition, the second island pattern 632b may be connected to the eighth connector 611b of the first touch signal line 611 through the contact hole 621h. Accordingly, the touch driving signal transmitted through the second touch signal line 612 may be transmitted to the second detection pattern 632 through the tenth connector 612b. However, since the second island pattern 632b is not connected to the second detection pattern 632, the touch driving signal transmitted through the first touch signal line 611 is not transmitted to the second detection pattern 632.

Figure 6E:
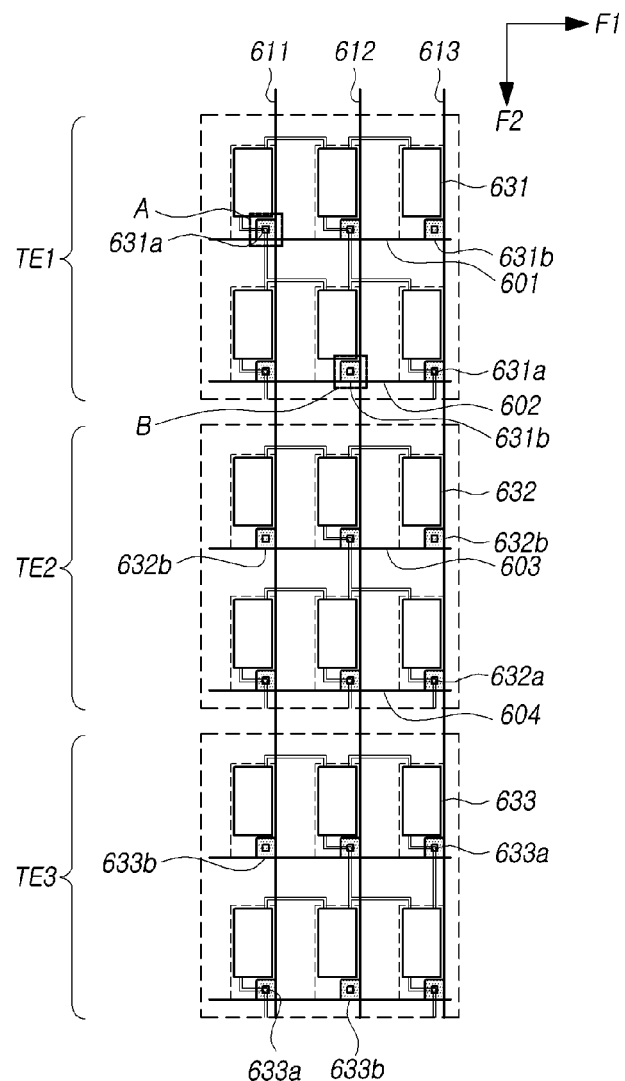

In addition, as shown in FIG. 6E, the first lower electrode line 601 may be connected to the first detection pattern 631 through the first connector 601a, and the second lower electrode line 602 may be connected to the first detection pattern 631 through the second and third connectors 602a and 602b. Accordingly, the first lower electrode line 601, the second lower electrode line 602, and the first detection pattern 631 may become the first touch electrode TE1.

In addition, the third lower electrode line 603 may be connected to the second detection pattern 632 through the fourth connector 603a, and the fourth lower electrode line 604 may be connected to the second detection pattern 632 through the fifth and sixth connectors 604a and 604b. Accordingly, the third lower electrode line 603, the fourth lower electrode line 604 and the second detection pattern 632 may become the second touch electrode TE2.

Further, the first touch signal line 611 may be connected to the first detection pattern 631 by the seventh connector 611a and the first connection pattern 631a, and the second touch signal line 612 may be connected to the second detection pattern 632 by the tenth connector 612b and the second connection pattern 632a.

Accordingly, the touch driving signal transmitted through the first touch signal line 611 may be transmitted to the first detection pattern 631 through the seventh connector 611a. However, since the first island pattern 631b is not connected to the first detection pattern 631, the touch driving signal transmitted through the second touch signal line 612 is not transmitted to the first detection pattern 631.

In addition, the second upper electrode patterns 632, 632a, 632b may include a second detection pattern 632, and a second connection pattern 632a and a second island pattern 632b corresponding to the second detection pattern 632. The second connection pattern 632a is a pattern connected to the second detection pattern 632, and the second island pattern 632b is a pattern not connected to the second detection pattern 632. The second connection pattern 632a may be connected to the fourth connector 603a of the third lower electrode line 603 and the fifth connector 604a and the sixth connector 604b of the fourth lower electrode line 604 through a contact hole. In addition, the second connection pattern 632a may be connected to the tenth connector 612b of the second touch signal line 612 through a contact hole 621h.

The second island pattern 632b may be connected to the eighth connector 611b of the first touch signal line 611 through the contact hole 621h. That is, the touch driving signal transmitted through the second touch signal line 612 may be transmitted to the second detection pattern 632 through the tenth connector 612b. However, since the second island pattern 632b is not connected to the second detection pattern 632, the touch driving signal transmitted through the first touch signal line 611 is not transmitted to the second detection pattern 632.

In addition, the touch sensor 140 may include a third touch electrode TE3 having the same pattern as a first touch electrode TE1 and the second touch electrode TE2. The third upper electrode patterns 633, 633a, 633b may include a third detection pattern 633, and a third connection pattern 633a and a third island pattern 633b corresponding to the third detection pattern 633. The third connection pattern 633a is a pattern connected to the third detection pattern 633, and the third island pattern 633b is a pattern not connected to the third detection pattern 633.

In the display period Td shown in FIG. 4, a common voltage Vcom is applied to the first upper electrode patterns 631, 631a, 631b and the second upper electrode patterns 632, 632a, 632b, and in the touch sensing period Ts, the load free driving signal LFD may be applied to the first upper electrode patterns 631, 631a, 631b and the second upper electrode patterns 632, 632a, 632b. In the display period Td, the first upper electrode patterns 631, 631a, 631b and the second upper electrode patterns 632, 632a, 632b may each apply the common voltage Vcom to the plurality of pixels 101.

Figure 7A:
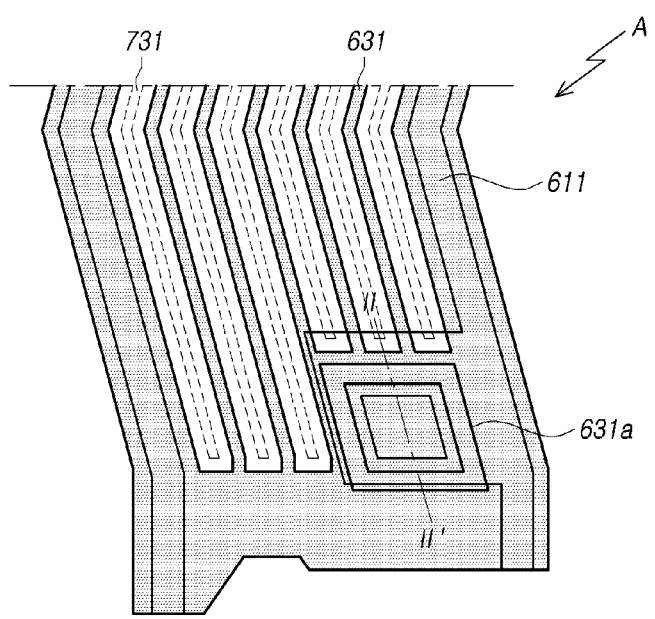
FIG. 7A is a plan view illustrating a partial area of a display device in which one pixel and a touch sensor are disposed to overlap each other according to embodiments of the present disclosure.
Figure 7B:
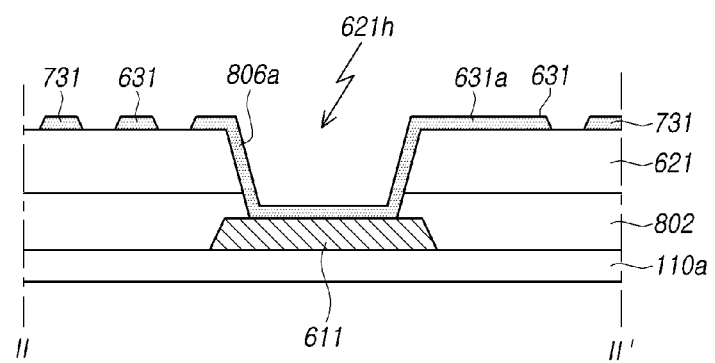
FIG. 7B is a cross-sectional view illustrating a cross section of II-II' shown in FIG. 7A.

FIG. 7A is a plan view illustrating a partial area of a display device in which one pixel and a touch sensor are disposed to overlap each other according to embodiments of the present disclosure, and FIG. 7B is a cross-sectional view illustrating a cross section of II-II' shown in FIG. 7A. In FIG. 7A, the part (A) illustrates a portion in which the first detection pattern 631 among the first upper electrode patterns 631, 631a, and 631b shown in FIG. 6E is connected to the first touch signal line 611 by the first connection pattern 631a.

Referring to FIGS. 7A and 7B, a first touch signal line 611 may be disposed on a lower substrate 110a. A first insulating layer (not shown) may be disposed between the first touch signal line 611 and the lower substrate 110a. In addition, a second insulating layer 621 may be disposed on the first touch signal line 611. A contact hole 621h may be formed in the second insulating layer 621. The contact hole 621h may be disposed to overlap the first touch signal line 611.

In addition, first upper electrode patterns 631, 631a, and 631b may be disposed on the second insulating layer 621. The common electrode 350 shown in FIG. 2 may be disposed on the second insulating layer 621 by the first upper electrode patterns 631, 631a and 631b. Among the first upper electrode patterns 631, 631a and 631b, the first detection pattern 631 may correspond to the common electrode 350. In addition, an electrode pattern 731 may be disposed on the second insulating layer 621. The electrode pattern 731 may correspond to the pixel electrode 340 illustrated in FIG. 2. The first detection pattern 631 and the electrode pattern 731 are not connected to each other. In addition, a first via 806a may be formed in the contact hole 621h by the first upper electrode patterns 631, 631a, and 631b.

The first via 806a may contact the first touch signal line 611. Accordingly, the first detection pattern 631 may receive a touch signal from the first touch signal line 611 through the first connection pattern 631a in which the first via 806a is formed. The first via 806a is connected to the common electrode 350. In addition, a color filter 802 may be disposed under the second insulating layer 621.

Figure 8A:
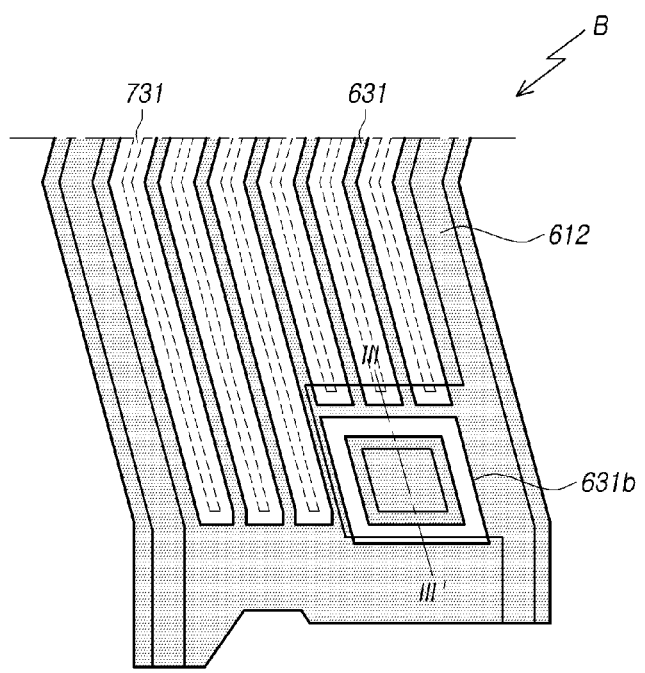
FIG. 8A is a plan view illustrating a partial area of a display device in which one pixel and a touch sensor are disposed to overlap each other according to embodiments of the present disclosure.
Figure 8B:
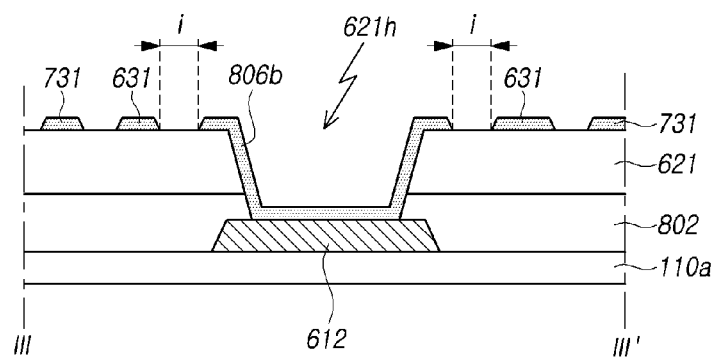
FIG. 8B is a cross-sectional view illustrating a cross section of shown in FIG. 8A.

FIG. 8A is a plan view illustrating a partial area of a display device in which one pixel and a touch sensor are disposed to overlap each other according to embodiments of the present disclosure, and FIG. 8B is a cross-sectional view illustrating a cross section of shown in FIG. 8A. In FIG. 8A, the part (B) illustrates a portion in which the first detection pattern 631 among the first upper electrode patterns 631, 631a, and 631b shown in FIG. 6E is not connected to the second touch signal line 612 due to the first island pattern 631b.

Referring to FIGS. 8A and 8B, a second touch signal line 612 may be disposed on a lower substrate 110a. A first insulating layer (not shown) may be disposed between the second touch signal line 612 and the lower substrate 110a. In addition, a second insulating layer 621 may be disposed on the second touch signal line 612. A contact hole 621h may be formed in the second insulating layer 621. The contact hole 621h may be disposed to overlap the second touch signal line 612.

In addition, second upper electrode patterns 632, 632a, and 632b may be disposed on the second insulating layer 621. A pixel electrode 340 and a common electrode 350 may be disposed on the second insulating layer 621 by the second upper electrode patterns 632, 632a and 632b. The pixel electrode 340 and the common electrode 350 are not connected to each other. In addition, a second via 806b may be formed in the contact hole 621h by the second upper electrode patterns 632, 632a, 632b.

The second via 806b may contact the second touch signal line 612. However, the second via 806b is spaced apart from the common electrode 350 at a predetermined distance i. Accordingly, the touch signal transmitted through the second touch signal line 612 is not transmitted to the common electrode 350. In addition, a color filter 802 may be disposed under the second insulating layer 621.

Figure 9:
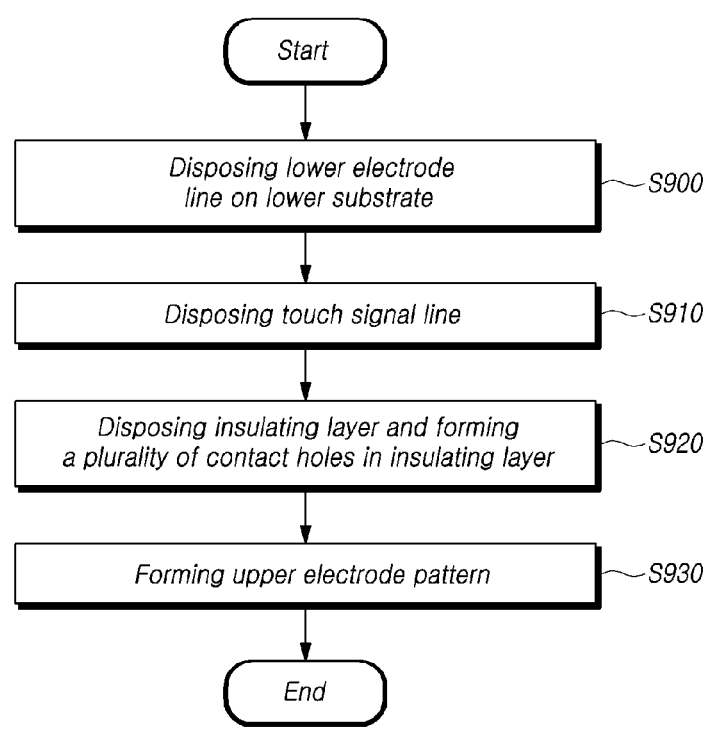
FIG. 9 is a flowchart illustrating a manufacturing method of a display device according to embodiments of the present disclosure.

FIG. 9 is a flowchart illustrating a manufacturing method of a display device according to embodiments of the present disclosure.

Referring to FIG. 9, a lower electrode line may be disposed on a lower substrate 110a (S900). The lower electrode line may include first to fourth lower electrode lines 601 to 604. The first lower electrode line 601 may include a first connector 601a and the second lower electrode line 602 may include a second connector 602a and a third connector 602b. In addition, the third lower electrode line 603 may include a fourth connector 603a, and the fourth lower electrode line 604 may include a fifth connector 604a and a sixth connector 604b.

In addition, a gate insulating layer may be disposed on the lower substrate 110a, and first to fourth lower electrode lines 601 to 604 may be disposed above the gate insulating layer.

The distance d1 between the first connector 601a and the second connector 602a, the distance d2 between the second connector 602a and the third connector 602b, and the distance d3 between the third connector 602b and the first connector 601a may be the same as the distance d4 between the fourth connector 603a and the fifth connector 604a, and the distance d5 between the fifth connector 604a and the sixth connector 604b, and the distance d6 between the sixth connector 604b and the fourth connector 603a respectively. Accordingly, the pattern of the first and second lower electrode lines 601 and 602 in which the first to third connectors 601a, 602a, and 602b are arranged may be the same as the pattern of the third and fourth lower electrode lines 603 and 604 in which the fourth to sixth connectors 603a, 604a, and 604b are arranged.

Since the patterns of the first and second lower electrode lines 601 and 602 and the patterns of the third and fourth lower electrode lines 603 and 604 are the same, after the first to fourth lower electrode lines 601 to 604 are arranged, a pattern inspection may be performed to check whether the patterns of the first to fourth lower electrode lines 601 to 604 are the same. Defects of the first to fourth lower electrode lines 601 to 604 may be determined through pattern inspection.

In addition, a first insulating layer may be disposed above the first to fourth lower electrode lines 601 to 604, and the first touch signal line 611 including a seventh connector 611a and an eighth connector 611b and a second touch signal line 612 including a ninth connector 612a and a tenth connector 612b may be disposed on the first insulating layer (S910).

The distance S1 between the seventh connector 611a and the ninth connector 612a may be the same as the distance S2 between the eighth connector 611b and the tenth connector 612b. Since the distance S1 between the seventh connector 611a and the ninth connector 612a becomes the same as the distance S2 between the eighth connector 611b and the tenth connector 612b, the pattern of the region of the first touch electrode TE1 including the seventh connector 611a and the ninth connector 612a may be the same as the pattern of the region of the second touch electrode TE2 including the eighth connector 611b and the tenth connector 612b.

Since the pattern of the first touch electrode TE1 and the pattern of the second touch electrode TE2 are the same, after the first touch signal line 611 and the second touch signal line 612 are arranged, a pattern inspection may be performed to check whether the patterns of the first touch electrode TE1 and the second touch electrode TE2 are the same. Defects of the first touch signal line 611 and the second touch signal line 612 may be determined through pattern inspection.

A second insulating layers 621 may be disposed on the second touch signal line 612, and a plurality of contact holes 621h may be formed in the second insulating layer 621 at positions overlapping the first to tenth connectors 601a to 612b (S920). The pattern of the contact hole 621h disposed at the position corresponding to the first touch electrode TE1 may be the same as the pattern of the contact hole 621h disposed at the position corresponding to the second touch electrode TE2. Accordingly, a pattern inspection of inspecting a pattern with respect to the position of the contact hole 621h may be performed.

An upper electrode pattern may be disposed on the second insulating layer 621. (S930) The upper electrode pattern may include the first upper electrode patterns 631, 631a connected to the first to third connectors 601a, 602a, 602b and the seventh connector 611a, and the second upper electrode patterns 632, 632a connected to the fourth to sixth connectors 603a, 604a, 604b and tenth connector 612b on the second insulating layer 621.

When the first upper electrode patterns 631, 631a, 631b and the second upper electrode patterns 632, 632a, 632b are disposed, the vias 806a and 806b may be formed in the contact hole 621h. The first upper electrode patterns 631, 631a, 631b may be connected to the first touch signal line 611 or the second touch signal line 612 and at least one of the first lower electrode line to the fourth lower electrode line 601 to 604 through the vias 806a and 806b.

The first upper electrode patterns 631 and 631a may be connected to the first lower electrode line 601 and the second lower electrode line 602 through the first to third connectors 601a, 602a, 602b, and the second upper electrode patterns 632 and 632a may be connected to the third lower electrode line 603 and the fourth lower electrode line 604 through the fourth to sixth connectors 603a, 604a and 604b. As a result, the first touch electrode TE1 and the second touch electrode TE2 may be formed. That is, the first touch electrode TE1 may have a mesh shape by the first upper electrode patterns 631 and 631a, the first lower electrode line 601 and the second lower electrode line 602, and the second touch electrode TE2 may have a mesh shape by the second upper electrode patterns 632 and 632a, the third lower electrode line 603 and the fourth lower electrode line 604.

In addition, the first upper electrode patterns 631 and 631a may be connected to the first touch signal line 611 through the seventh connector 611a so as to be supplied with a touch signal from the first touch signal line 611. Also, the second upper electrode patterns 632 and 632a may be connected to the second touch signal line 612 through the tenth connector 612b so as to receive a touch signal from the second touch signal line 612.

In one embodiment, the first upper electrode patterns 631, 631a and 631b may include a first detection pattern 631, and a first connection pattern 631a and the first island pattern 631b corresponding to the first detection pattern 631. The second upper electrode patterns 632, 632a, 632b may include a second detection pattern 632 and, a second connection pattern 632a and a second island pattern 632b corresponding to the second detection pattern 632.

Furthermore, the first connection pattern 631a may be connected to the first detection pattern 631 and the second connection pattern 632a may be connected to the second detection pattern 632. On the other hand, since the first island pattern 631b is separated from the first detection pattern 631, the first island pattern 631b is not connected to the first detection pattern 631, and since the second island pattern 632b is separated from the second detection pattern 632, the second island pattern 632b is not connected to the second detection pattern 632.

Since the first island pattern 631b and the second island pattern 632b are formed, the first to fourth lower electrode lines 601 to 604, the first touch signal line 611 and the second touch signal lines 612 are arranged in a regular pattern to perform pattern inspection. Accordingly, it is possible to improve the inspection efficiency and the productivity.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A display device comprising:
a display panel including a plurality of pixels; and
a touch sensor having a first touch electrode, a second touch electrode, and a first touch signal line and a second touch signal line disposed to overlap with the first touch electrode and the second touch electrode respectively,
wherein the first touch electrode includes a first lower electrode line including a first connector, a second lower electrode line including a second connector and a third connector, and a first upper electrode pattern disposed above the first lower electrode line and the second lower electrode line and connected to the first lower electrode line and the second lower electrode line through the first connector to the third connector,
wherein the second touch electrode includes a third lower electrode line including a fourth connector, a fourth lower electrode line including a fifth connector and a sixth connector, and a second upper electrode pattern disposed above the third lower electrode line and the fourth lower electrode line and connected to the third lower electrode line and the fourth lower electrode line through the fourth connector to the sixth connector,
wherein the first touch signal line is disposed to overlap the first lower electrode line to the fourth lower electrode line, and includes a seventh connector and eighth connector overlapping the first lower electrode line and the third lower electrode line, respectively,
wherein the second touch signal line is disposed to overlap the first lower electrode line to the fourth lower electrode line, and includes a ninth connector and tenth connector overlapping the second lower electrode line and the fourth lower electrode line, respectively, and,
wherein the first upper electrode pattern is connected to the first touch signal line among the first touch signal line and the second touch signal line, and the second upper electrode pattern is connected to the second touch signal line among the first touch signal line and the second touch signal line.

2. The display device of claim 1,
wherein the first upper electrode pattern includes a first detection pattern and a first connection pattern and a first island pattern corresponding to the first detection pattern, and the second upper electrode pattern includes a second detection pattern and a second connection pattern and a second island pattern corresponding to the second detection pattern,
wherein, the first connection pattern is connected to the first detection pattern and the first island pattern is separated from the first detection pattern in the first touch electrode, and the second connection pattern is connected to the second detection pattern and the second island pattern is separated from the second detection pattern in the second touch electrode, and
wherein the first connection pattern overlaps the seventh connector and the second connection pattern overlaps the tenth connector.

3. The display device of claim 2, wherein each of the first detection pattern and the second detection pattern corresponds to one of a plurality of pixels.

4. The display device of claim 1, wherein a distance between the first connector and the second connector, a distance between the second connector and the third connector, and a distance between the third connector and the first connector are the same as a distance between the fourth connector and the fifth connector, a distance between the fifth connector and the sixth connector, and a distance between the sixth connector and fourth connector, respectively.

5. The display device of claim 1, wherein a distance between the seventh connector and the ninth connector is the same as a distance between the eighth connector and the tenth connector.

6. The display device of claim 1, wherein the display panel operates by dividing the driving time into a display period and a touch sensing period.

7. The display device of claim 6, wherein, in the display period, the first upper electrode pattern and the second upper electrode pattern are supplied with a common voltage.

8. A display device comprising:
a first touch signal line and a second touch signal line disposed on a first insulating layer;
a second insulating layer disposed on the first touch signal line and the second touch signal line;
a first via connected to the first touch signal line and a second via connected to the second touch signal line through a first contact hole and a second contact hole respectively included in the second insulating layer; and
a common electrode disposed on the second insulating layer,
wherein the first via is connected to the common electrode and the second via is not connected to the common electrode.

9. The display device of claim 8, further comprising a pixel electrode disposed on the second insulating layer and not connected to the common electrode.

10. The display device of claim 8, further comprising a color filter disposed between the first insulating layer and the second insulating layer.

11. The display device of claim 8, wherein the common electrode includes a first detection pattern and a first connection pattern and a first island pattern corresponding to the first detection pattern,
wherein the first connection pattern is connected to the first detection pattern, and the first island pattern is not connected to the first detection pattern.

12. The display device of claim 8, wherein the common electrode operates by dividing the driving time into a display period and a touch sensing period.

13. The display device of claim 12, wherein the common electrode is supplied with a common voltage in the display period.

14. A manufacturing method of a display device comprising:
disposing a gate insulating layer on a lower substrate, and disposing a first lower electrode line including a first connector, a second lower electrode line including a second connector and a third connector, a third lower electrode line including a fourth connector, and a fourth lower electrode line including a fifth connector and a sixth connector;
disposing a first insulating layer above the first lower electrode line to the fourth lower electrode line, and disposing a first touch signal line including a seventh connector and an eighth connector and a second touch signal line including a ninth connector and a tenth connector on the first insulating layer;
disposing a second insulating layer on the second touch signal line, and forming a plurality of contact holes in the second insulating layer each disposed at positions overlapping with the first to tenth connectors; and disposing, on the second insulating layer, a first upper electrode pattern connected to the first to third connectors and the seventh connector, and a second upper electrode pattern connected to the fourth to sixth connector and the tenth connector.

15. The manufacturing method of a display device of claim 14, wherein the first upper electrode pattern includes a first detection pattern and a first connection pattern and a first island pattern corresponding to the first detection pattern, and the second upper electrode pattern includes a second detection pattern and a second connection pattern and a second island pattern corresponding to the second detection pattern.

16. The manufacturing method of a display device of claim 14, wherein a distance between the first connector and the second connector, a distance between the second connector and the third connector, and a distance between the third connector and the first connector are the same as a distance between the fourth connector and the fifth connector, a distance between the fifth connector and the sixth connector, and a distance between the sixth connector and fourth connector, respectively.

17. The manufacturing method of a display device of claim 14, wherein a distance between the seventh connector and the ninth connector is the same as a distance between the eighth connector and the tenth connector.

18. The manufacturing method of a display device of claim 14, wherein a pattern inspection is performed after disposing the first lower electrode line to the fourth lower electrode line.

19. The manufacturing method of a display device of claim 14, wherein a pattern inspection is performed after disposing the first touch signal line and the second touch signal line.

* * * * *